United States Patent [19]

Feldkämper

[11] Patent Number: 4,459,866
[45] Date of Patent: Jul. 17, 1984

[54] NON-UNIFORM DRIVE WITH BALANCING OF MASSES

[75] Inventor: Richard Feldkämper, Lengerich, Fed. Rep. of Germany

[73] Assignee: Windmöller & Hölscher, Lengerich, Fed. Rep. of Germany

[21] Appl. No.: 306,740

[22] Filed: Sep. 29, 1981

[30] Foreign Application Priority Data

Sep. 30, 1980 [DE] Fed. Rep. of Germany ....... 3036930

[51] Int. Cl.³ .................... F16H 21/14; F16N 35/02
[52] U.S. Cl. .................................. 74/69; 74/393; 74/603; 83/324
[58] Field of Search ............. 74/69, 66, 64, 393, 74/603, 604; 83/324, 593

[56] References Cited

U.S. PATENT DOCUMENTS

| 1,115,000 | 10/1914 | Martin | 74/69 |
| 2,067,513 | 1/1937 | Talbot | 74/69 |
| 2,364,393 | 12/1944 | Seeck | 74/69 |
| 3,613,471 | 10/1971 | Shields | 83/324 |
| 3,805,628 | 4/1974 | Hulin | 74/69 |
| 3,896,677 | 7/1975 | Larson | 74/61 |

FOREIGN PATENT DOCUMENTS

| 1012792 | 7/1957 | Fed. Rep. of Germany . |
| 1907871 | 9/1970 | Fed. Rep. of Germany . |
| 2724026 | 4/1978 | Fed. Rep. of Germany . |

Primary Examiner—Lawrence J. Staab
Assistant Examiner—Michael J. Gonet
Attorney, Agent, or Firm—Fleit, Jacobson, Cohn & Price

[57] ABSTRACT

Non-uniform drive comprising a flywheel disc for balancing masses and a slide crank drive in which the crank pin is guided in a slideway provides for an adjustable spacing between the crank shaft and the shaft of the slideway. A second crank pin lies opposite the first crank pin at substantially the same spacing from the axis of the shaft of the slideway and drives the freely rotatable flywheel disc.

3 Claims, 6 Drawing Figures

NON-UNIFORM DRIVE WITH BALANCING OF MASSES

The invention relates to a non-uniform drive, preferably for driving knife rollers, with balancing of masses.

DE-OS No. 19 07 871 describes as disadvantageous a non-uniform drive for knife rollers which, to avoid the uneven loading of the drive, are provided with a second non-uniform drive with additional gyrating mass driving a compensating mass in such a way that the compensating mass is retarded when the knife roller is accelerated and vice versa. The reason given for the disadvantage is that this manner of balancing moments calls for considerable constructional expense, the duplicate arrangement of the non-uniform drive as well as the arrangement of a knife roller counter-mass involving twice the number of masses which are in motion.

It is therefore the problem of the present invention to provide non-uniform drive with balancing of masses that is characterised by a simple construction.

According to the invention, this problem is solved in that in the slot shaped slideway for the crank pin of a slide crank drive having an adjustable spacing between the crank shaft and the shaft of the slideway, there is arranged a second crank pin which lies opposite the first crank pin at substantially the same spacing from the axis of the shaft of the slideway and which drives the freely rotatable flywheel disc. The non-uniform drive according to the invention has a simple construction consisting of few parts because only one slide crank drive is provided of which the slot-shaped slideway guides the crank pin of the crank shaft as well as the crank pin which drives the flywheel disc with opposite acceleration.

The flywheel disc may be freely rotatable on the crank shaft, the first crank pin passing through an arcuate elongate hole of the flywheel disc.

Simple adjustment of the non-uniformity can be achieved in that the slideway is secured to the end of a gear freely rotatable on a lever which can be pivoted on a fixed bushing and fixed in position, and that in the bushing there is freely rotatable the drive shaft on which there is secured a pinion engaging the gear.

According to a particularly advantageous development of the invention, it is provided that two shafts carrying the two crank pins are coaxially mounted in a plummer block longitudinally displaceable in the machine frame and at their ends opposite the crank pins there are secured arms which are provided with slideways and are disposed at 180° to the arms carrying the crank pins, and that the slideways guide crank pins of which one is associated with the output shaft mounted in the frame in alignment with the shaft of the slideway and the other is associated with the flywheel coaxial with the output shaft. By longitudinally displacing the plummer block mounting the shafts provided with the crank pins, a large degree of non-uniformity with balancing of masses can be set. It is also particularly advantageous that the driving and driven shafts are aligned irrespective of the set degree of non-uniformity.

Examples of the invention will now be described in detail with reference to the drawing, in which.

Figure 1:
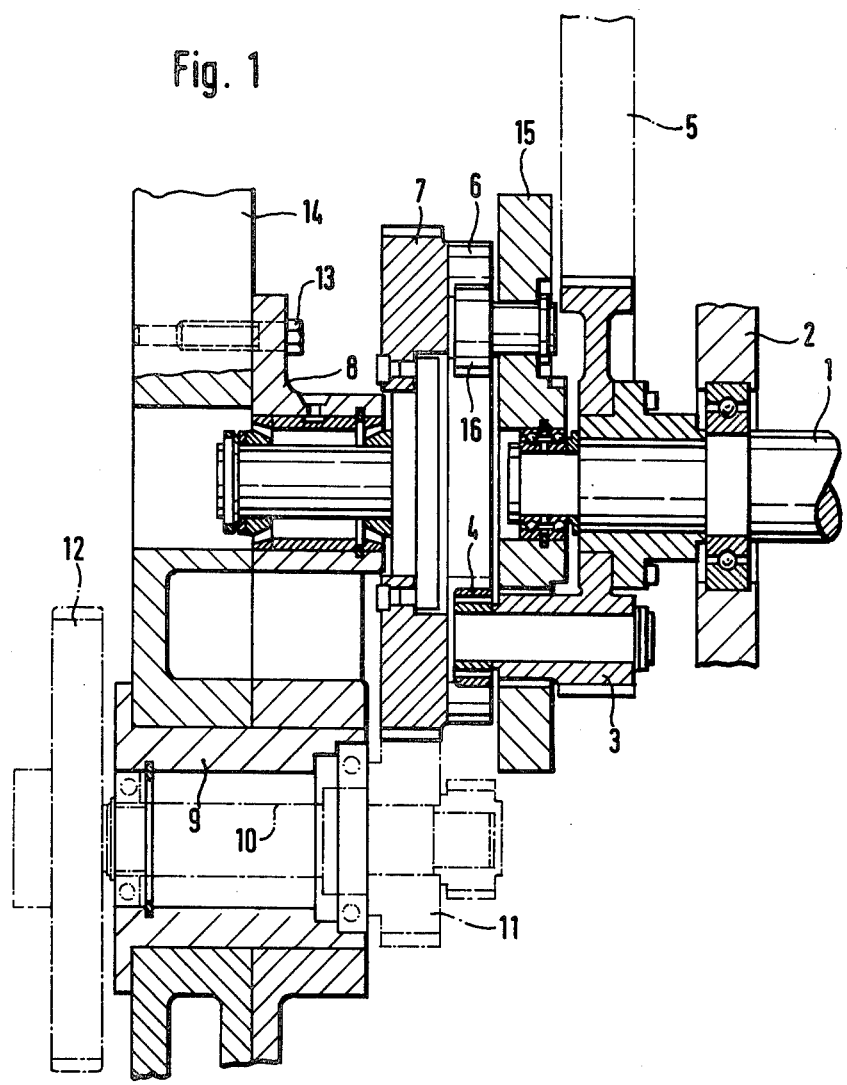
FIG. 1 is a section through a slide crank drive with compensating mass and with a pivotable bearing of the shaft for the slideway.
Figure 2:
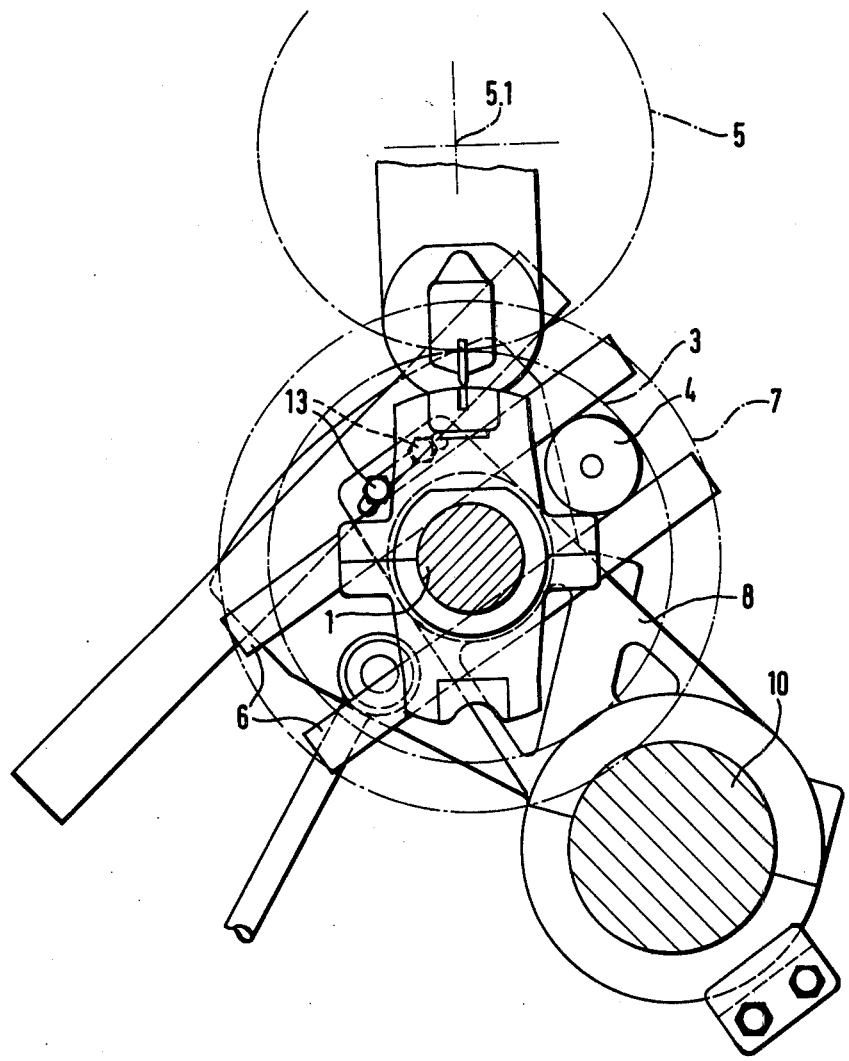
FIG. 2 is a side elevation of the slide crank drive according to FIG. 1.
Figure 3:
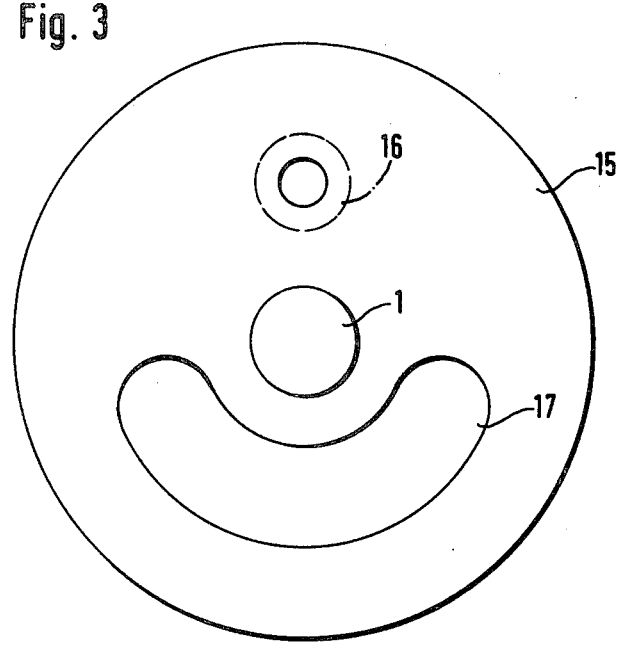
FIG. 3 is a plan view on the flywheel disc.

The slide crank drive shown in FIGS. 1 to 3 comprises a shaft 1 mounted in the machine frame 2, which shaft forms the output shaft of the slide crank drive and may also be the shaft of a grooved roller cooperating with a knife roller. The output shaft 1 is driven by a crank 3 which carries a crank pin in the form of a roller 4. The crank 3 is also constructed as a spur gear in mesh with spur gear 5 which can for example drive the shaft of the knife roller.

The roller 4 is guided in a groove-shaped slideway 6 secured to the end of the driven gear 7 which is rotatably mounted in a lever 8. The lever 8 is pivotable on a bushing 9 and can be fixed in position. A shaft 10 rotatably mounted in the bushing 9 carries the spur gears 11 and 12. The spur gear 12 is driven in a manner not shown by the pinion of a motor or another gear whilst the spur gear 11 is in mesh with the gear 7. By driving the spur gear 12, the output shaft 1 and the shaft (not shown) of the gear 7 are set into rotation.

In the position shown in FIG. 1, the gear 7 and output shaft 1 are aligned so that, on uniform rotation of the gear 7, the output shaft 1 will likewise turn continuously. After loosening the bolts 13 by which the lever 8 is fixed to the wall 14 of the frame, the lever 8 can be pivoted on the bushing 9 so that the non-uniformity of the slide crank drive can be set. To compensate the inertia forces produced by the non-uniformity, the output shaft 1 supports a freely rotatable flywheel disc 15 to which there is likewise mounted a roller 16 forming a crank pin which is likewise guided in the groove-shaped slideway 6. The flywheel disc 15 is provided with an arcuate elongate hole 17 through which the shaft of the roller 4 passes. The roller 16 is diametrally opposite the roller 4 so that retardation forces occur on the roller 16 when the roller 4 is accelerated, and vice versa. The flywheel disc 15 is so large that the inerta forces produced thereby substantially correspond to, for example, the inertia forces caused by the groove and knife rollers as well as the drive gears.

Figure 6:
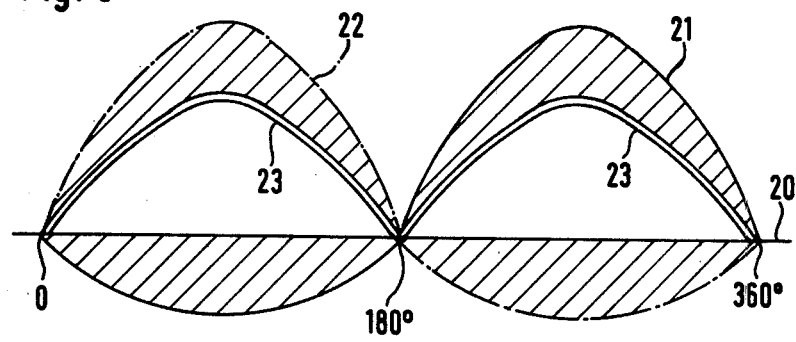
FIG. 6 is a diagram showing the inertia forces appearing in the slide crank drive.

In FIG. 6, the inertia forces occurring during one revolution are shown in a graph above the zero line. The full line 21 represents the inertia forces of a cutting mechanism and the chain-dotted line 22 represents the inertia forces of the flywheel disc 15. As will be evident from the graph, the forces of both masses are offset from each other by a phase of 180° so that they partly cancel each other out, the cross-hatched areas disposed below the zero line 20 being subtracted from the cross-hatched areas above the line 20. The remaining inertia forces correspond to the amounts, represented by the double lines 23.

Figure 4:
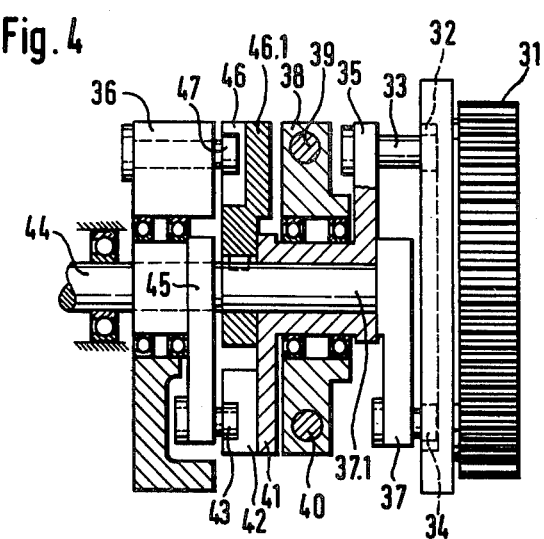
FIG. 4 is a partial section through a slide crank drive with compensating mass with two crank shafts coaxially mounted in a longitudinally displaceable plummer block.
Figure 5:
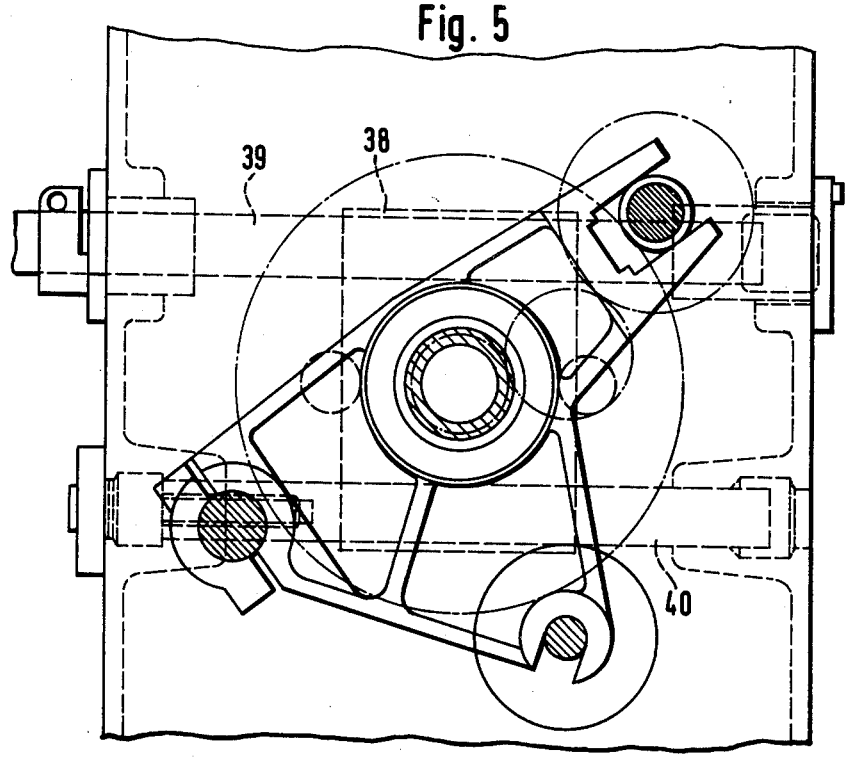
FIG. 5 is a side elevation of the FIG. 4 slide crank drive.

A double slide crank drive is shown in FIGS. 4 and 5. The drive is introduced to a spur gear 31 provided with a groove 32 in which rollers 33 and 34 run, the roller 33 belonging to the crank 35 which transmits the force and the roller 34 belonging to the crank 37 which drives the balancing mass. The crank 35 is freely rotatable in a plummer block 38 which is displaceable on bolts 39, 40 fixed with respect to the frame. The bearing pin of the crank 35 is drilled through and formed as a slide bearing for the bearing pin 37.1 of the crank 37. The hollow bearing pin carries an arm 41 with a groove 42 into which a roller 43 engages, which roller is freely rotatable on an arm 45 secured to an output shaft 44. The bearing pin 37.1 carries an arm 46.1 having a groove 46 in which there runs a roller 47 which is freely rotatable on the balancing mass 36. The balancing mass 36 is loosely rotatable on the output shaft 44. By means of the double slide crank drive according to FIG. 4, a high non-uniformity can be transmitted after displacement on the bolts 39, 40. The balancing of masses takes place as for the drive in FIG. 1.

The slide crank drive with balancing of masses can be employed for driving the shafts of knife and groove rollers to achieve cuts which are shorter or longer than the circumference of the circle travelled by the knife. In such a drive, high inertia forces arise through the non-uniformity and these can be considerably reduced by the balancing of masses brought about by the flywheel discs.

I claim:

1. Non-uniform drive, preferably for driving knife rollers, said drive comprising:
   means to provide motive power to said drive;
   an output shaft rotatable about an axis for providing a variable speed output from said drive;
   a flywheel disc freely rotatably carried on said output shaft for balancing rotating masses;
   input means cooperating with said means to provide motive power, said input means carrying a slot-shaped slideway disposed transversely to the axis of said output shaft;
   a first crank pin carried by said output shaft and received in said slideway, for drivingly interconnecting said output shaft and said slideway said first crank pin spaced radially from the axis of rotation of said output shaft;
   a second crank pin carried by said flywheel disc and which lies diametrically opposite the first crank pin at substantially the same spacing from the axis of rotation of said output shaft and which drives the freely rotatably flywheel disc, each of said crank pins lying on the same side of said slideway; and
   said flywheel disc having an arcuate elongated hole and the first crank pin passing through said arcuate elongate hole of the flywheel disc.

2. Non-uniform drive according to claim 1 wherein the slideway is secured to the end of a gear that is freely rotatably carried on a lever which can be pivoted on a fixed bushing and fixed in position, and that the means to provide motive power includes a drive shaft freely rotatable in the bushing and on which there is secured a pinion for engaging the gear.

3. Non-uniform drive comprising:
   means to provide motive power to said drive;
   an output shaft rotatable about an axis for providing a variable speed output from said drive;
   a flywheel disc freely rotatably carried on said output shaft for balancing rotating masses;
   input means cooperating with said means for providing motive power, said input means for rotatably carrying a slot-shaped slideway disposed transversely to the axis of said output shaft;
   a first crank pin carried by said output shaft in a first drive arm, said drive arm including a second crank pin receivable in said slideway for drivingly interconnecting said output shaft and said slideway, said first crank pin spaced radially from the axis of rotation of said output shaft;
   a third crank pin carried by said flywheel disc and which lies diametrically opposite the first crank pin at substantially the same spacing from the axis of the shaft of the slideway and which is receivable in a second drive arm, said drive arm including a fourth crank pin received in said second slideway for driving the freely rotatable flywheel disc, each of said second and fourth crank pins lying on the same side of said slideway;
   said first and second drive arms being coaxially mounted in a plummer block longitudinally displaceable relative to said output shaft, said drive arms including slideways to receive the first and third crank pins.

* * * * *